United States Patent [19]

Cortelezzi et al.

[11] Patent Number: 5,621,032
[45] Date of Patent: Apr. 15, 1997

[54] FLUXED COMPOSITES

[75] Inventors: Richard D. Cortelezzi, Mentor; Clifford C. Martin, Chardon, both of Ohio

[73] Assignee: Elastochem, Inc., Chardon, Ohio

[21] Appl. No.: 430,150

[22] Filed: Apr. 26, 1995

Related U.S. Application Data

[62] Division of Ser. No. 135,125, Oct. 8, 1993, abandoned, which is a continuation of Ser. No. 774,587, Oct. 10, 1991, abandoned.

[51] Int. Cl.$^6$ ......................................... C08K 5/36
[52] U.S. Cl. .......................... 524/262; 524/275; 524/392; 524/487; 524/488; 524/489; 524/563; 524/585; 106/270; 252/182.17
[58] Field of Search ...................... 524/262, 275, 524/392, 487, 488, 489, 563, 585; 106/270; 252/182.17

[56] References Cited

U.S. PATENT DOCUMENTS

| | | |
|---|---|---|
| 3,798,196 | 3/1974 | Rocktaschel et al. . |
| 3,842,111 | 10/1974 | Meyer-Simon et al. . |
| 3,873,489 | 3/1975 | Thurn et al. ............................. 524/262 |
| 3,938,574 | 2/1976 | Burmester et al. . |
| 3,947,436 | 3/1976 | Rocktaschel et al. . |
| 3,997,356 | 12/1976 | Thurn et al. . |
| 3,997,581 | 12/1976 | Pletka et al. . |
| 4,072,701 | 2/1978 | Pletka et al. . |
| 4,076,550 | 2/1978 | Thurn et al. . |
| 4,129,585 | 12/1978 | Buder et al. . |
| 4,152,347 | 5/1979 | Pletka et al. . |
| 4,222,930 | 9/1980 | Pletka et al. . |
| 4,229,333 | 10/1980 | Wolff et al. . |
| 4,463,125 | 7/1984 | Stuchal ..................................... 524/566 |
| 5,164,501 | 11/1992 | Deschler et al. . |

FOREIGN PATENT DOCUMENTS

| | | |
|---|---|---|
| 15649/70 | 12/1971 | Australia . |
| 2213202 | 12/1973 | Germany . |
| 224605 | 7/1985 | Grenada ................................. 524/262 |
| 1126017 | 9/1968 | United Kingdom . |

OTHER PUBLICATIONS

Romps Chemie–Lexikon, 8th edition, 1988, vol. 6, pp. 4563/4564.
Handbook Of Adhesives, 3rd ed., Edited by Irving Skeist, Van Nostrand Reinhold, New York, pp. 9, 62, 63, and 536–548.

*Primary Examiner*—Romulo H. Delmendo
*Attorney, Agent, or Firm*—Calfee Halter & Griswold

[57] ABSTRACT

A method and product which provides a solid, non-powdered homogeneous form to liquid and low melting point solid compounds which facilitates stability, storage, dispersability and handling and which may be added directly to formulations requiring the liquid compound or low melting point solid compound. The liquid or low melting point solid ingredient is combined with a binder which is comprised of at least a wax and thermoplastic polymer. During the method of forming the product, both the binder and the liquid compound (or low melting point solid compound) pass through a liquid phase during which they are mixed. The product is then formed and cooled.

23 Claims, No Drawings

FLUXED COMPOSITES

This is a divisional of application Ser. No. 08/135,125 filed on Oct. 8, 1993, abandoned which is a continuation of Ser. No. 07/774,587 filed Oct. 10, 1991, abandoned.

BACKGROUND OF THE INVENTION

The large scale industrial and commercial uses of liquid and low melting point solid bulk materials pose a multitude of practical problems. Such materials are difficult to handle; their physical properties lead to inaccurate measurements. Their physical form frequently results in a significant percentage of waste due to materials adhering to containers and handling equipment. Frequently, such materials have a limited shelf life due to decomposition. Decomposition presents a particular problem with organic peroxides which, over time, become unstable and present an explosive hazard. Low melting point solids, those solids having a melting point below 120° F., become semi-solid and usually tacky, as they approach their melting point. While this may not present a significant problem at room temperature, the ambient temperature in many plant operations may exceed 100° F. and approach the melting point of the low melting point solids. Even if the ambient temperature is well below the melting point of the low melting point solid, if the solid has been previously exposed to temperatures near the melting point, the product may have partially melted and "coalesced" into a large agglomerate.

Attempts have been made to address these problems by mixing certain liquid or low melting point solid materials with solid compounds thereby giving such materials an interim solid form so that they will remain solid over a wider temperature range. The resulting product is then added to formulations which call for the liquid or low melting point solid. However, the products that result from such attempts have significant drawbacks. Frequently, the dispersion of the liquid or low melting solid material is not uniform; this results in a wide variability in the concentration of the material within the product. Variability is a particular problem in products which use mineral fillers, such as clay, as a binder component. Where the liquid or low melting point solid is absorbed or adsorbed onto a mineral filler like clay, there is a strong tendency toward particle agglomerations especially if the product experiences wide temperature variation during transportation and storage. Where a mineral such as clay is mixed into a liquid, the clay tends to settle out before the product fully solidifies, resulting in a stratified product. This stratification produces an uneven concentration of the liquid or low melting point solid throughout the final product. Also, products that have a mineral filler as a binder, present a dispersion problem during the products incorporation into the end formulation, such as into a rubber formulation.

Also, such products frequently have a low "activity", that is, the product contains a low percentage of the desired liquid or low melting point solid ingredient. A higher activity is desired by the purchasers since first, more of the desired liquid or low melting point solid is available for the money, and, second, since the product will have correspondingly less binder, there are fewer compatibility problems between the binder and the purchaser's formulation which requires the liquid or low melting point solid.

In addition, such products are frequently powdered. Powders may present a respiratory hazard for persons handling the product and may present an explosive hazard as well. Furthermore, many products "bleed", that is, the liquid ingredient tends to disassociate from the solid component.

It would be desirable to have a liquid or low melting point solid in a solid form, to facilitate handling, measuring and storing, and which can be added directly to the processes which require the liquid or low melting point solid ingredient. It would also be desirable to have a high activity, homogenous product in a non-powdered form. Finally, a product that would fully melt into a formulation, such as a rubber formulation, during processing, eliminating the undispersed solid particles, would be very desirable.

SUMMARY OF INVENTION

The present invention relates to either a liquid compound or a low melting point solid compound, referred to herein as "active ingredients", uniformly mixed with a binder, to provide a solid composite of high activity and longer shelf life, and also relates to the method of their preparation. The composites provide a temporary form for liquid or low melting point solid ingredients; the composites may be incorporated into a variety of industrial and/or commercial processes in the same way that the active ingredient would be used. The composites may be added to processes which tolerate the addition of the binder. Composites may be made of a variety of active ingredients, such as: organic dialkyl peroxides; modified melamine resins; cyanurates; aldehydeamines; phenylamines; methacrylates; organosilanes and organo-phosphites. As used herein "composite" means a solid mixture of an active ingredient and a binder. The "activity" of a particular composite, that is, the percentage of active ingredient in the composite, will depend upon the type of active ingredient. The active ingredient is "composited" by being combined with a thermoplastic binder, which contains a wax, and a thermoplastic polymer. Depending upon the type of active ingredient in the composite, the binder may also contain a compatibilizing agent such as a fatty acid or an ethylene vinyl acetate copolymer resin, or both. Optional minor components, such as wetting agents, stabilizers, plasticizers, homogenizing agents and mineral oils may also be added.

The composite is prepared by blending the active ingredient with the binder preferably while both are in a liquid phase, then cooling the mixture and forming or shaping the composite, using conventional forming procedures.

DETAILED DESCRIPTION OF THE INVENTION

The Active Ingredient

According to the present invention, a variety of liquid and low melting point solid active ingredients are "composited" to produce composites that are easier and safer to handle, easier to measure, have an increased shelf life, and a high activity, that is, a high percentage, in some composites up to 80%, of the active ingredient. The maximum percentage of active ingredient depends on the type of active ingredient. When more than the maximum percent of the active ingredient is present in the composite (and thus, less than minimum binder is present) the composite becomes oily, frosted and/or tacky. This condition is often described as surface bloom. Where the active ingredient is present in the preferred amount, the composite has a high activity without a surface bloom. Where the active ingredient is present in an amount between the preferred amount and the maximum amount, the composite contains some surface bloom but may be satisfactory for some uses. While as little as about 1% active ingredient may be present in the composite, the economic interests dictate that the composite have a higher activity, usually at least 30%.

For organic peroxide, a high activity means the composite will have about 70% to about 80% organic peroxide. For cyanurates, modified melamine resins, organo-silanes, organo-phosphites, and aldehyde-amine reaction products, a high activity means the composite will have about 50% to about 80% active ingredient. For phenylamine based antidegradants and methacrylates, a high activity means the composite will have about 60% to about 80% active ingredient.

Composites may be made of a variety of organic peroxides, for example, dialkyl peroxides, including dicumyl peroxide, 2,5-dimethyl-2,5-di(t-butylperoxy)hexane, a,a'-di(t-butyl peroxy)diisopropylbenzene, 2,5-dimethyl-2,5-di(t-butylperoxy) hexyne-3 and butyl-4,4-bis(t-butylperoxy) valerate. A suitable dicumyl peroxide is sold by Hercules, Inc. under the tradename DICUP R, or by Akzo Chemicals Inc. under the tradename PERKADOX BC. A suitable 2,5-dimethyl-2,5-di(t-butylperoxy)hexane is sold by Akzo Chemicals Inc. under the tradename TRIGONOX 101, or by Atochem under the tradename LUPERSOL 101. A suitable a,a'-di(t-butyl peroxy)diisopropylbenzene is sold by Hercules, Inc. under the tradename VULCUP R, or by Akzo under the tradename PERKADOX 14S. A suitable 2,5-dimethyl-2,5-di(t-butylperoxy) hexyne-3 is sold by Atochem under the tradename LUPERSOL 130 or by Akzo under the tradename TRIGONOX 145. A suitable m-butyl-4,4-bis(t-butylperoxy) valerate is sold by Akzo under the tradename TRIGONOX 17, or by Atochem under the tradename LUPEROX 230.

The compositization of organic peroxides according to this invention preserves the shelf life of the peroxides, and thus is particularly beneficial because peroxides are unstable and over time, present an explosive hazard. In additions many organic peroxides are semi-solids at operating temperature and thus are difficult to handle and measure because of their tendency to stick to containers and to reagglomerate. The organic peroxide composites of the present invention overcome these problems.

A composite may be made containing a modified melamine resin, (also known as modified melamine formaldehyde resin) such as hexamethoxymethylmelamine. A suitable hexamethoxymethylmelamine is available from American Cyanamid under the Trademark "Cyrez 963" or from Monsanto Company under the Trademark "Resimene 3520". Hexamethoxymethylmelamine is a methylene donor and is widely used particularly in the tire industry, as an adhesion promoter.

Composites may be made from cyanurates, such as triallyl cyanurate, which is a low melting point solid and triallyl isocyanurate, which is a liquid at room temperature. A suitable triallyl cyanurate is sold by Akzo under the tradename PERKALINK 300, or by American Cyanamid under the tradename TRIALLYLCYANURATE. A suitable triallyl isocyanurate is sold by Akzo under the tradename PERKALINK 301. Cyanurates are used in various industrial applications as reactive monomers for free radical polymerization. In the rubber industry cyanurates are used as co-agents, in the non-sulfur, (peroxide) curing of rubber.

Composites may be made of phenylamine based antidegradants such as: phenylenediamines, such as N-phenyl-N'-2-octyl-p-phenylenediamine, which is a liquid at room temperature; alkylated diphenylamines; and the reaction products of diphenylamines, such as the reaction product of diphenylamine and acetone, commercially available as "BLE-25" from Uniroyal. The BLE-25 formulation is proprietary; it is characterized by a viscosity of 25–50 poise at 86° F., and specific gravity of 1.08 to 1.10. A suitable N-phenyl-N'-2-octyl-p-phenylenediamine is sold by UOP Inc. under the tradename UOP 688. The phenylamine based antidegradants serve as antidegradants in rubber compositions.

Composites may be made of methacrylates, such as trimethylolpropane trimethacrylate and trimethylolpropane triacrylate. A suitable trimethylolpropane trimethacrylate is sold by Sartomer Corporation under the Trademark "Sartomer Resin 350". A suitable trimethylolpropane triacrylate is also sold by Sartomer Corporation under the Trademark "Sartomer Resin 351". Methacrylates often serve as a co-agent in the peroxide curing of rubber.

Composites may be made of organo-silanes, such as bis(3-triethoxysilylpropyl)tetrasulfane and a liquid organo-functional silane known as "UCARSIL RC-1" and sold by Union Carbide. The formulation of "UCARSIL RC-1" is proprietary. A suitable bis(3-triethoxysilylpropyl)tetrasulfane is sold by Degussa Corporation under the tradename "SI-69". Organo-silanes serve as adhesion promoters and coupling agents in rubber formulations.

A composite according to the present invention may also be made of organo-phosphites, such as tri(mononylphenyl)phosphite and tri(dinonylphenyl)phosphite or mixtures thereof. A suitable mixture is sold under the trademark "POLYGARD HR" by Uniroyal Chemical Company. The organo-phosphites serve as antidegradants in rubber compositions.

Composites may also be made of aldehyde-amine reaction products, such as butyraldehyde-aniline reaction products, butyraldehyde-butylamine reaction products, formaldehyde-ammonia-ethyl chloride reaction products, and heptaldehyde-aniline reaction products. A suitable butyraldehyde-butylamine reaction product is sold by R. T. Vanderbilt under the tradename "VANAX 833". A suitable formaldehyde-ammonia-ethyl chloride reaction product is sold by Uniroyal under the tradename "TRIMENE BASE". A suitable heptaldehyde-aniline reaction product is sold by Uniroyal under the tradename "HEPTEEN BASE". Suitable butyraldehyde-aniline reaction products are sold by R. T. Vanderbilt under the tradenames "VANAX AT" and "Vanax 808". The aldehyde-amine reaction products serve as accelerators in rubber formulations.

It should be understood that the active ingredients, particularly commercial grades, depending on their source, may contain substantial amounts of a wide variety of impurities. Therefore, such impurities also will be incorporated into the composite.

The Binder

As used herein, the term "binder" includes all additives, except the active ingredient, in the composite. The binder has a higher melting point/softening point than the active ingredient, and imparts the solid form to the composite. The binder contains at least one wax, and at least one thermoplastic polymer, for example, a polyolefin, preferably polyethylene, most preferably oxidized polyethylene. Depending on the type of active ingredient, the binder may also contain at least one compatibilizing agent, for example, ethylene vinyl acetate copolymer resin or a fatty acid, or mixtures thereof. A compatibilizing agent promotes the compatibility between the active ingredient and the binder, which promotes the cohesiveness of the composite. Where the active ingredient and the binder are of sufficiently different polarity so that the composite is not cohesive, a compatibilizing agent may be required. Optional minor components such as wetting agents, stabilizers, plasticizers, and mineral oils may also be added.

Any wax could be used, including, but not limited to, petroleum derived waxes such as paraffin and microcrystalline wax, and natural waxes such as beeswax and carnauba. Good results have been obtained using paraffin wax or a microcrystalline wax or mixture of both. Paraffin is preferred. However, it should be understood that paraffin may contain some microcrystalline wax. While any paraffin wax may be used, good results have been obtained using a paraffin wax having a melting point in the range of 140° to 145° F. A suitable paraffin is sold by Astor Wax Company available through M. F. Cachat, Cleveland, Ohio under the Trademark "Astax 140/145 Paraffin". The wax helps impart the solid form to the binder.

A thermoplastic polymer, such as polyethylene, preferably oxidized polyethylene, promotes compatibility between the active ingredient and the binder components and helps to impart the necessary hardness to the composite. A suitable oxidized polyethylene having a melting point from about 170° F. to about 250° F., a viscosity from about 80 to about 160 cps at 120° C., and a hardness of from about 1 to about 5 penetration units at 25° C., is sold by Hüls of Germany, and is available from M. F. Cachat, Cleveland, Ohio under the Trademark "Vestowax AO 1539".

Depending on the active ingredient, a fatty acid may be added to the binder. The addition of fatty acids improves the compatibility of the active ingredient and the binder, and also lowers the initial melting point of the composite. Preferably, fatty acid is added where the active ingredient is a modified melamine resin, a cyanurate, or a reaction product of acetone and diphenylamine. Due to the difficulty in separating fatty acids, a fatty acid is a mixture of several different fatty acids. Preferably, a fatty acid having a stearic acid content from about 10% to about 92% stearic acid, and more preferably, a high stearic acid content fatty acid having a stearic acid content of 70% is used. The other fatty acids present in the mixture typically include palmitic acid, oleic acid and myristic acid. These fatty acids may also be used alone or in combination although they are not preferred. A suitable high stearic acid content fatty acid is sold by Witco Industries under the Trademark "HYSTRENE 7018".

Depending on the type of active ingredient in the composite, an ethylene vinyl acetate copolymer resin may also be added. Preferably, ethylene vinyl acetate copolymer resin is added where the active ingredient is a phenylamine based antidegradant, a cyanurate, a modified melamine resin, an organo-phosphite, or the liquid organo-functional silane "RC-1". Ethylene vinyl acetate copolymer resin acts as a homogenizer and also increases the viscosity of the heated binder-active ingredient blend, which provides a more defined shape upon forming. Good results have been obtained using an ethylene vinyl acetate copolymer resin having about 18% vinyl acetate, about 82% ethylene and a softening point of 190° F. A suitable resin is sold by DuPont DeNemours Company under the Tradename "Elvax" and also sold by Quantum Chemical under the Tradename "ULTRATHENE".

The percentage of individual binder components will depend upon the type of active ingredient in the composite. The following binder component percentages represent the percent of total binder composition. When the active ingredient is an organic peroxide, the paraffin may be present in the binder from about 20% to about 95%, preferably about 63.3%. The polyethylene is present in the binder from about 5% to about 80%, preferably about 36.%.

Where the active ingredient is a modified melamine resin, such as hexamethoxymethylmelamine, the paraffin may be present in the binder from about 1% to 60% of the total binder composition, preferably about 30%. The polyethylene is present in the binder from about 1% to about 40%, preferably about 20%. In addition, the binder contains either from about 1% to about 40%, of ethylene vinyl acetate copolymer resin or from about 1% to about 50%, fatty acid, or both. Preferably, the binder contains both fatty acid and ethylene vinyl acetate copolymer resin; preferably about 40% fatty acid and about 10% ethylene vinyl acetate copolymer resin.

Where the active ingredient is a cyanurate, the paraffin is present in to the binder in an amount from about 1% to about 60% of the total binder composition, preferably about 30%. The polyethylene is present in the binder from about 1% to about 40%, preferably about 15%. In additions the binder contains either from about 1% to about 40% of ethylene vinyl acetate copolymer resin or from about 1% to about 50% fatty acids or both. Preferably, the binder contains both fatty acid and ethylene vinyl acetate copolymer resin; preferably about 40% fatty acid and about 15% ethylene vinyl acetate copolymer resin.

Where the active ingredient is a phenylamine, such as N-phenyl-N'-2-octyl-p-phenylenediamine, the paraffin is present in the binder in an amount from about 5% to about 70% of the total binder composition, preferably about 38%. The polyethylene is present in the binder from about 1% to about 40%, preferably about 12%. Preferably from about 5% to about 70%, preferably about 50%, of ethylene vinyl acetate copolymer resin is added.

Where the active ingredient is a liquid high temperature reaction product of acetone and a diphenylamine, such as "BLE-25", the paraffin is present in the binder in an amount from about 5% to about 50% of the total binder composition, preferably about 20%. The polyethylene is present in the binder from about 1% to about 60%, preferably about 30%. In addition, the binder contains either from about 1% to about 60% of ethylene vinyl acetate copolymer resin or from about 1% to about 50% fatty acid, or both. Preferably, the binder contains both fatty acid and ethylene vinyl acetate copolymer resin; preferably about 20% fatty acid and about 30% ethylene vinyl acetate copolymer resin.

Where the active ingredient is an organo-silane such as bis(3-triethoxysilylpropyl)tetrasulfane, the paraffin is present in the binder in an amount from about 20% to about 95% of the total binder composition, preferably about 63.3%. The polyethylene is present in the binder from about 5% to about 80%, preferably about 36.7%. Where the active ingredient is the liquid organo-functional silane "UCARSIL RC-1", the paraffin is present in the binder in an amount from about 5% to about 70% of the total binder composition, preferably about 47.5%. The polyethylene is present in the binder from about 1% to about 50%, preferably about 27.5%. Preferably, ethylene vinyl acetate copolymer resin is also present in the binder from about 1% to about 60%, more preferably about 25%.

Where the active ingredient is a methacrylate the paraffin is present in the binder in an amount from about 20% to about 99% of the total binder composition, preferably about 63.3%. The oxidized polyethylene is present in the binder from about 1% to about 80%, preferably about 36.7%.

Where the active ingredient is an organo-phosphite, the paraffin is present in the binder in an amount from about 5% to about 50% of the total binder composition, preferably about 20%. The oxidized polyethylene is present in the binder from about 1% to about 60%, preferably about 40%. Preferably, ethylene vinyl acetate copolymer resin is also present in the binder from about 1% to about 60%, more preferably about 40%.

Where the active ingredient is an aldehyde-amine reaction product, the paraffin is present in the binder in an amount from about 5% to about 95%, preferably about 50.6%. The oxidized polyethylene is present in the binder from about 1% to about 60%, preferably about 29.4%. Preferably, ethylene vinyl acetate copolymer is also present in the binder from about 1% to about 50%, more preferably about 20%.

Additional components such as stabilizers, plasticizers, wetting agents and mineral oils may be added, in minor amounts, to the binder. Stabilizers, such as hydroquinone, may be added to the binder in an amount from about 0.1% to about 10%, to prevent the oxidation or hydrolysis of the active ingredient in the composite. Plasticizers, such as phthalate plasticizers, preferably diisodecylphthalate or dioctylphthalate may be added to the binder in an amount from about 1% to about 20% to decrease the melting point of the composite. Wetting agents, such as amine derivatives of fatty acids, may be added in an amount from 1% to about 50% to promote compatibility of the active ingredient in the composite. Mineral oils, such as paraffinic oils and naphthenic oils, may be added to the binder to decrease the melting point of the composite. A suitable paraffinic oil is sold by Sun Oil under the Trademark "SunPar 2280". A suitable naphthenic oil is sold by Ergon under the Tradename "Hyprene V 2000". The mineral oil is added in an amount sufficient to adjust the melting point of the composite to the desired melting point.

The Composite

The composite of the active ingredient and the binder is prepared by combining the active ingredient with the binder so that at some point in the mixing procedure, the binder and the active ingredient are both in a liquid phase, and are then blended while both are in a liquid phase. As used herein, "liquid phase" includes high viscosity paste-like phases. This may be accomplished by mixing the liquid active ingredient (or if active ingredient is a semi-solid, heating the active ingredient beyond its melting point) with a molten binder. Alternatively, the active ingredient may be mixed with a solid binder and the temperature of the mixture raised above the melting points of the active ingredient and the binder ingredients. Then, once both the active ingredient and binder are in a liquid phase, they are thoroughly blended to provide a homogenous mixture, at a temperature which will keep both the binder and active ingredient in a liquid phase. After a thorough blending, the homogenous mixture is cooled just above the melting point of the composite. The mixture is then fed through conventional forming processes so that the finished composite may be in the form of pellets, pastilles, flakes, prills, powder or slabs, depending upon the desired form. A suitable method of forming the composites into pastilles, or half sphere shape, is by using a rotary head for forming drops onto a cooled stainless steel conveyor. This equipment is available from Sandvik Process Systems Inc.

It should be noted that as the percent of active ingredient in the composite is increased, (and the percentage of binder is correspondingly decreased) the tolerances of the binder and its components become narrower. That is, as the percentage of active ingredient increases, the percentage range of each binder component that will provide a satisfactory composite becomes narrower. Similarly, the type of the binder components needed to provide a satisfactory composite also become restricted. Where the percentage of active ingredient is very high, the preferred optional ingredients may become necessary ingredients; that is, they become necessary to maintain the form of the composite.

When there is less binder in the composite, it becomes more difficult to obtain a solid composite and more difficult to form or shape the composite. These results affect not only the finished product, but also affect the operating speed of the composite forming equipment and the stability of the composite during storage and transportation. Also, decreasing the binder percentage in the composite reduces the compatibility between the active ingredient and the binder.

While the following examples of composites contain one active ingredient, more than one active ingredient may be added to a composite. It should be understood that composites having two or more active ingredients are within the scope of this invention.

The Organic Peroxide Composite

Organic peroxides, such as dialkyl peroxides may be present in the composite from about 30% to about 80%, preferably about 70%. The binder is present from about 20% to about 70%, preferably about 30%. Dialkyl peroxide composites may be prepared as follows.

EXAMPLE 1

A dicumyl peroxide (DCP) composite was prepared by measuring 136 kilograms of a recrystallized grade DCP, from Akzo Inc. which is 96–100% pure and has a melting point of about 100° F. The DCP was then placed in a vat with a hot water jacketing. The water temperature within the jacketing was controlled to yield a DCP temperature of from 150°–160° F. The binder was prepared separately by melting together 36.7% of the total binder weight, or 21.4 kilograms of oxidized polyethylene (VESTOWAX AO 1539) having a melting point of 225° F. and 63.3%, or 36.9 kilograms of ASTAX 140/145 paraffin. The polyethylene and paraffin were thoroughly blended together in a heated blend tank at 195° F. Then the DCP was added to the liquid binder. The DCP-binder mixture was then thoroughly blended. (The addition of the DCP to the binder decreased the temperature of the mixture roughly to 170° F.) When a homogenous mixture was achieved, it was then fed in portions through a pelletizer, while the remainder was mildly agitated in the tank. The pelletizer, a Sandvik process system, dispensed the DCP-binder mixture in droplets onto a cold stainless steel conveyer belt. As a result, composite pellets in a "half-sphere" shape were produced.

EXAMPLE 1A

A dicumyl peroxide (DCP) composite was also prepared by first preparing the binder. The binder was prepared by melting together 36.7% of the total binder weight, or 21.4 kilograms, of oxidized polyethylene (VESTOWAX AO 1539) having a melting point of 225° F. and 63.3%, or 36.9 kilograms of ASTAX 140/145 paraffin. The polyethylene and paraffin were thoroughly blended together in a heated blend tank at 195° F. Then 136 kilograms of a recrystallized grade DCP, from Akzo Chemical Inc. which is 96–100% pure and has a melting point of about 100° F., was added to molten binder. The DCP-binder mixture was then thoroughly blended. (The addition of the DCP to the binder decreases the temperature of the mixture roughly to 170° F.) When a homogenous mixture was achieved, it was then fed in portions through a pelletizer, while the remainder was mildly agitated in the tank. The pelletizer, a Sandvik process system, dispensed the DCP-binder mixture in droplets onto a cold stainless steel conveyer belt. As a result, composite pellets in a "half-sphere" shape were produced.

EXAMPLE 2

An a,a'di(t-butylperoxy)diisopropylbenzene composite was prepared by first preparing the binder which was made by placing 36.7% of the total binder weight, or 5.5 grams of oxidized polyethylene (VESTOWAX AO 1539) having a melting point of 225° F. and 63.3%, or 9.5 grams of ASTAX 140/145 paraffin in an aluminum dish. The dish was then heated on a hot plate to melt the binder components. When temperature reached 250° F. and the binder components were completely melted, the binder was thoroughly stirred. The binder was then cooled to just above 225° F. and then 70% or 35 grams of a,a'di(t-butylperoxy)diisopropylbenzene was added. The a,a'di(t-butylperoxy)diisopropylbenzene-binder mixture was maintained at between 150°–200° F. and thoroughly blended. When a homogenous mixture was achieved, production methods for forming the composite were simulated by dispensing droplets from a stirring rod onto a chilled metal surface, such as aluminum. As a result, composite pellets in a "half-sphere" shape were produced.

EXAMPLE 3

A 2,5-dimethyl-2,5-di(t-butylperoxy)hexane (DBPH) composite was prepared as in Example 2. the binder was prepared by mixing together 36.7% of the total binder weight or 9.2 grams oxidized polyethylene, (VESTOWAX AO 1539) and 63.3% or 15.8 grams of ASTAX 140/145 paraffin having a 140°–145° F. melting point. An equal weight, 25 grams, of DBPH, (LUPERSOL 101) was added to the binder mixture while agitating the mixture. The composite was prepared as in Example 2.

The Modified Melamine Resin Composite

The modified melamine resin, such as hexamethoxymethylmelamine, may be present in the composite in an amount of from about 1% to about 80%, preferably about 30% to about 70%, most preferably about 50%. The binder is present from about 20% to about 99%, preferably about 70% to about 30%, most preferably about 50%. A hexamethoxymethylmelamine composite was prepared as follows.

EXAMPLE 4

The composite was prepared as in Example 2. The binder was prepared by mixing together 20% of the total binder weight or 5 grams, oxidized polyethylene (VESTOWAX AO 1539), 30% or 7.5 grams, of ASTAX 140/145 paraffin having a 140°–145° F. melting point, 40% or 10 grams stearic acid (HYSTRENE 7018) and 10% or 2.5 grams EVA copolymer (ELVAX). An equal weight, 25 grams of hexamethoxymethylmelamine, (CYREZ 963) was added to the binder mixture while agitating the mixture. The composite was prepared as in Example 2.

The Cyanurate Composite

The cyanurate may be present in the composite in an amount from about 1% to about 80%, preferably 30% to about 70%, most preferably about 50%. The binder is present from about 20% to about 99%, preferably about 70% to about 30%, most preferably about 50%. A triallyl cyanurate (TAC) composite was prepared as follows.

EXAMPLE 5

The composite was prepared as in Example 2. The binder was prepared by mixing together 15% of the total binder weight or 3.75 grams of an ethylene vinyl acetate copolymer resin, (ELVAX), 15% or 3.75 grams oxidized polyethylene, (VESTOWAX AO 1539), 40% or 10 grams high stearic acid content fatty acid (HYSTERENE 7018) and 30% or 7.5 grams ASTAX 140/145 paraffin having a 140°–145° F. melting point. An equal weight, 25 grams of TAC, (PERKALINK 300) was added to the binder mixture while agitating the mixture. The composite was prepared as in Example 2.

The Phenylamine Composite

Phenylamines, particularly phenylamine based antidegradants, may be present in the composite in an amount from about 30% to about 80%, preferably about 60%. The binder is present from about 20% to about 70%, preferably about 30% to about 50%, preferably about 40%. Phenylamine composites may be prepared as follows.

EXAMPLE 6

A composite of N-phenyl-N'-2-octyl-p-phenylenediamine was prepared as in Example 2. The binder was prepared by mixing together 50% of the total binder weight or 10 grams of an ethylene vinyl acetate copolymer resin, (ELVAX) 12% or 2.4 grams oxidized polyethylene (VESTOWAX 1539) and 38% or 7.6 grams ASTAX 140/145 paraffin having a 140°–145° F. melting point. Then 30 grams of N-phenyl-N'-2-octyl-p-phenylenediamine, (UOP 688) was added to the binder mixture while agitating the mixture. The composite was prepared as in Example 2.

EXAMPLE 7

A composite of a high temperature reaction product of acetone and diphenylamine, commercially available as "BLE-25" from Uniroyal Chemical Company, was prepared as in Example 2. The binder was prepared by mixing together 30% of the total binder weight or 7.5 grams of an ethylene vinyl acetate copolymer resin, (ELVAX) 30% or 7.5 grams oxidized polyethylene, (VESTOWAX AO 1539) 20% or 5 grams ASTAX 140/145 paraffin having a 140°–145° F. melting point, and 20% or 5 grams of a high stearic acid content fatty acid. An equal weight, 25 grams, of BLE-25 was added to the binder mixture while agitating the mixture. The composite was prepared as in Example 2.

The Organo-silane Composite

The organo-silane may be present in the composite in an amount of from about 30% to about 80%, preferably about 50% where the organo-silane is bis(3-triethoxysilylpropyl)tetrasulfane and preferably about 60% where the organo-silane is UCARSIL RC-1. The binder is present from about 20% to about 70%, most preferably about 50%, where the organo-silane is bis(3-triethoxysilylpropyl)tetrasulfane, and preferably about 40% where the organo-silane is UCARSIL RC-1. Organo silane composites may be prepared as follows.

EXAMPLE 8

A composite of bis (3-triethoxysilylpropyl)tetrasulfane was prepared as in Example 2. The binder was prepared by mixing together a 36.7% of the total binder weight or 9.2 grams oxidized polyethylene (VESTOWAX AO 1539) and 63.3% or 15.8 grams ASTAX 140/145 paraffin having a 140°–145° F. melting point. An equal weight, 25 grams of bis(3-triethoxysilylpropyl)tetrasulfane, (DEGUSSA's Si-69) was added to the binder mixture while agitating the mixture. The composite was prepared as in Example 2.

EXAMPLE 9

A composite of the liquid organo-functional silane "UCARSIL RC-1" was prepared as in Example 2. The binder was first prepared by mixing together a 27.5% of the total binder weight or 5.5 grams oxidized polyethylene, (VESTOWAX AO 1539) 47.5% or 9.5 grams ASTAX 140/145 paraffin having a 140°–145° F. melting point, and 25% or 5 grams of ethylene vinyl acetate copolymer resin. Then 30 grams of UCARSIL RC-1 was added to the binder mixture while agitating the mixture. The composite was prepared as in Example 2.

The Methacrylate Composite

The methacrylate is present in the composite in an amount from about 30% to about 80%, preferably about 60%. The binder is present from about 20% to about 70%, preferably about 30% to about 50%, most preferably about 40%. A composite of trimethylolpropane trimethacrylate may be made as follows.

EXAMPLE 10

The composite was prepared as in Example 2. The binder was prepared by mixing 36.7% of the total binder weight or 7.3 grams oxidized polyethylene (VESTOWAX AO 1539) and 63.3% or 12.7 grams ASTAX 140/145 paraffin. Then 30 grams of trimethylolpropane trimethacrylate, (SARTOMER RESIN 350) was added to the binder mixture while agitating the mixture. The composite was prepared as in Example 2.

Organo-phosphite Composite

The organo-phosphite is present in the composite in an amount from about 30% to about 80%, preferably about 50%. The binder is present from about 20% to about 70%, most preferably about 50%. A composite of tri(mixed monononylphenyl and dinonylphenyl)phosphite may be made as follows.

EXAMPLE 11

A composite was prepared as in Example 2. The binder was prepared by mixing 40% of the total binder weight or 10 grams oxidized polyethylene, (VESTOWAX AO 1539) 20% or 5 grams ASTAX 140/145 paraffin, and 40% or 10 grams ethylene vinyl acetate copolymer resin (ELVAX). An equal weight, 25 grams, of "POLYGARD HR" a tri(mixed monononylphenyl and dinonylphenyl)phosphite, was added to the binder mixture while agitating the mixture. The composite was prepared as in Example 2.

The Aldehyde-Amine Reaction Product Composite

The aldehyde-amine reaction product composite is present in the composite in an amount from about 1 to 80% preferably 30% to about 70%, more preferably about 50%. The binder is present from about 30% to about 70% preferably about 50%. A composite of the reaction product or butyraldehyde and aniline may be prepared as follows.

EXAMPLE 12

A butyraldehyde-aniline composite was prepared as in Example 2. The binder was prepared by mixing together 20% of the total binder weight or 5 grams of ethylene vinyl acetate copolymer resin, (ELVAX) 29.4% or 7.3 grams oxidized polyethylene (VESTOWAX AO 1539) and 50.6% or 12.7 grams ASTAX 140/145 paraffin and mixed as in Example 2. A equal weight, 25 grams of VANAX 808, a butyraldehyde aniline reaction product was added, and the composite was prepared as in Example 2.

While Examples 2–12 were done on a laboratory scale, the same formulations can be adapted to a commercial scale with appropriate modifications similar to Examples 1 and 1A.

While the invention has been described with a certain degree of particularity, various adaptations and modifications can be made without departing from the scope of the invention as defined in the appended claims.

What I claim is:

1. A solid homogeneous composite comprising at least one sulfur-containing organosilane and a binder, the binder comprising a wax and oxidized polyethylene.

2. The composite of claim 1, wherein said composite contains about 30% to about 80% by weight of organosilane.

3. The composite of claim 1, wherein said organosilane is bis(3-triethoxysilylpropyl)tetrasulfane.

4. The composite of claim 2, wherein said binder is comprised of from about 20% to about 95% by weight of paraffin and from about 5% to about 80% oxidized polyethylene.

5. The composite of claim 2, wherein said composite comprises about 50% by weight of bis(3-triethoxysilylpropyl)tetrasulfane and about 50% by weight of binder, wherein the binder is composed of about 63.3% by weight of paraffin and about 36.7% by weight of oxidized polyethylene.

6. The composite of claim 2, wherein said binder contains ethylene vinyl acetate copolymer.

7. The composite of claim 6, wherein said composite contains about 30% to about 80% by weight of organosilane.

8. A composite comprising a solidified homogeneous mixture of:

(a) at least one active ingredient comprising a sulfur-containing organosilane; and (b) a binder comprising a wax and oxidized polyethylene, wherein said composite is formed by combining said binder and said organosilane while both are in the liquid phase.

9. The composite of claim 8, wherein said sulfur-containing organosilane is bis(3-triethoxysilylpropyl) tetrasulfane.

10. The composite of claim 9, wherein said thermoplastic polymer includes a second thermoplastic polymer in addition to oxidized polyethylene.

11. The composite of claim 10, wherein said wax is selected from the group consisting of microcrystalline wax, beeswax and paraffin wax.

12. The composite of claim 11, wherein said composite further contains a compatibilizing agent selected from the group consisting of fatty acid, EVA copolymer and mixtures thereof.

13. The composite of claim 8, wherein said thermoplastic polymer includes a second thermoplastic polymer in addition to oxidized polyethylene.

14. The composite of claim 13, wherein said wax is selected from the group consisting of microcrystalline wax, beeswax and paraffin wax.

15. The composite of claim 14, wherein said composite further contains a compatibilizing agent selected from the group consisting of fatty acid, EVA copolymer and mixtures thereof.

16. A composition comprising a mass of individual, discrete composites, said composites comprising a solidified mixture of (a) at lest one active ingredient comprising a sulfur-containing organosilane; and (b) a binder comprising a wax and a thermoplastic polymer, said mass of composites being produced by combining components (a) and (b) above together, blending said components (a) and (b) together while both are in the liquid phase to provide a homogeneous liquid mixture thereof, dividing said liquid mixture into discrete portions, and thereafter causing said discrete portions of homogeneous liquid mixture to solidify in the form of individual, discrete composites, the polymer in said binder including sufficient oxidized polyethylene to reduce the tendency of said organosilane to bleed out of said composite.

17. The composition of claim 16, polyethylene wherein said wax includes at least one of microcrystalline wax, bees wax and paraffin wax, and further wherein said binder also includes a compatibilizing agent selected from the group consisting of fatty acid, ethylene vinyl acetate copolymer and mixtures thereof.

18. The composition of claim 16, wherein said sulfur-containing organosilane is bis(3-triethoxysilylpropyl) tetrasulfane and further within said compatibilizing agent includes at least one of ethylene vinyl acetate copolymer and stearic acid.

19. The composite of claim 10, wherein the second thermoplastic polymer is polyethylene.

20. The composite of claim 13, wherein the second thermoplastic polymer is polyethylene.

21. The composite of claim 16, wherein said thermoplastic polymer includes a second thermoplastic polymer in addition to oxidized polyethylene.

22. The composite of claim 21, wherein the second thermoplastic polymer is polyethylene.

23. A solid homogenous- composite comprising at least one sulfur-containing organosilane and a binder, said binder comprising wax and sufficient oxidized polyethylene to reduce the tendency of said organosilane to bleed out of said composite.

* * * * *